July 31, 1934.  E. S. STODDARD  1,968,658

DISH RACK

Filed June 13, 1932

Inventor
Edgar S. Stoddard
By Cromwell, Greist & Warden
Attys

Patented July 31, 1934

1,968,658

UNITED STATES PATENT OFFICE 1,968,658

DISH RACK

Edgar S. Stoddard, Berwyn, Ill., assignor to The Conover Company, Chicago, Ill., a corporation of Illinois Application June 13, 1932, Serial No. 616,790

6 Claims. (Cl. 141—9)

The present invention relates to holders for positioning articles, and has particular reference to improvements in coated dish holders or racks and the like.

It is customary in dishwashing machines to support the dishes to be cleansed in orderly arrangement in wire or openwork racks. As the dishes are fragile and therefore are apt to be chipped or broken by contact with the metallic rack structure, it is desirable to coat the wire rack with a cushioning means such as a continuous coating of rubber or similar material. This rubber coating also has the advantage of protecting the metallic wire from rusting and other chemical reactions caused by contact with the cleansing liquids employed in the dishwashing process.

A primary object of the present invention is to produce a rubber coated rack or the like having thereon a protective coating.

An additional object is the production of a rubber coated dish rack having a coating containing a phenol condensation product.

Still another object is to provide a rubber surface with a plasticized phenol condensation product.

A further object is the provision of a rubber coated metallic surface with a coating of a flexible oil resistant varnish.

Figure 1:
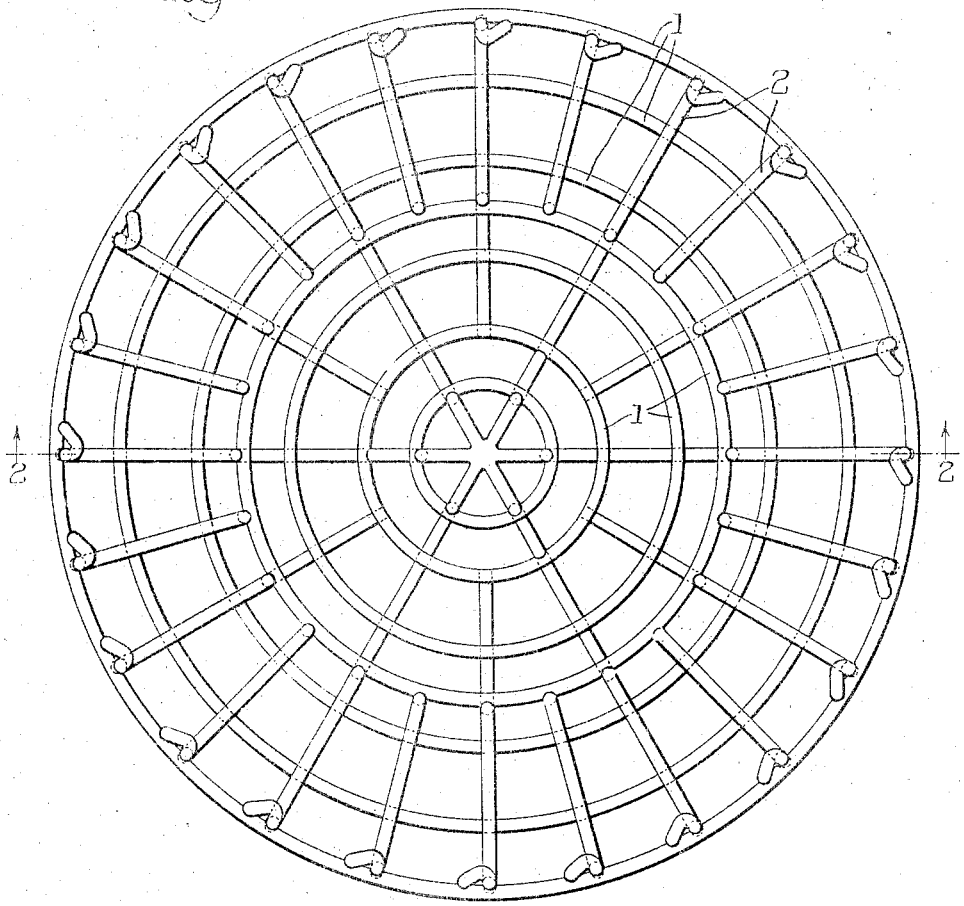
Figure 2:
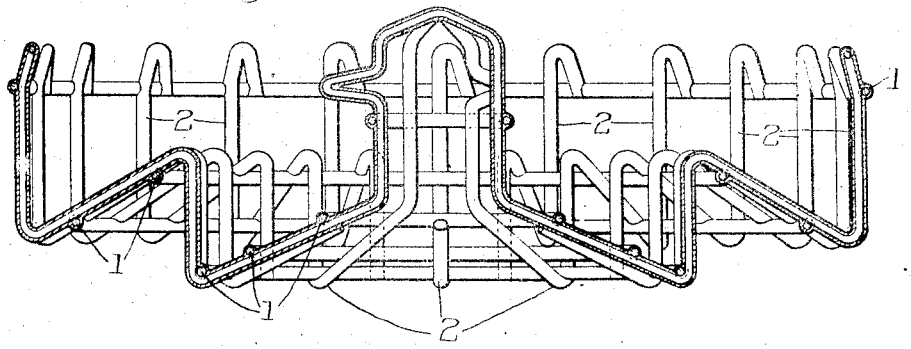

These and other objects will become apparent from a consideration of the following description and by reference to the accompanying drawing, in which Fig. 1 is a top view of a dish rack coated in accordance with my invention; and Fig. 2 is a sectional view taken along line 2—2 of Fig. 1.

In the drawing, the numeral 1 represents a plurality of concentric circular wires arranged at different levels, and the numeral 2 designates a plurality of radial wires which are secured to the circular wires to form a rigid container of such shape as to receive and properly position a number of dishes to be cleansed. The particular configuration of the rack is of no particular concern here, my invention being equally applicable to any structure of this sort.

The wires 1 and 2 are preferably made of some metal such as iron which may be easily bent into the desired shape. After formation of the wires into the shape of the finished rack, the rack is provided with a continuous layer of rubber, as described in Barker patent, No. 1,624,461, and Merseles patent, No. 1,553,624, by any suitable process for forming a continuous layer of rubber on metal. Where the wires cross and are attached together as by spot welding it is important that the rubber form a smooth continuous coating having no cracks or breaks through which water can penetrate.

In the preferred form of my invention the rubber coating is applied to the metal of the rack in such a manner as to prevent relative movement between the rubber coating and the metal. That is, the rubber adheres to the metal surface. In addition, the coating is desirably of such a thickness, flexibility and elasticity as to permit a substantial amount of stretching or bending of the same without tearing it loose from the metallic base and without causing a rupture or break in its surface. A rubber coating of approximately $\frac{1}{32}$ inch thickness has been found satisfactory.

When used in a dishwashing machine a rubber coated rack is subjected to a spray of hot water, which may be near the boiling point, containing soap, water softening agents, and impurities which are removed from the dishes. These conditions naturally are detrimental to the rubber. Also, rubber contains tarnish producing substances such as sulfur and sulfur compounds used in vulcanization which cause silverware and the like to rapidly tarnish.

In accordance with my invention, the rubber coated surface is provided with a protective coating of a varnish which is resistant to the conditions met with in dishwashing machines.

The varnish which I have found particularly desirable for the purpose described contains a phenol condensation product of the so-called "Bakelite" type in combination with a suitable drying oil, and can be air dried after application to the rubber. Lacquers or varnish such as customarily used in coating rubber come off very rapidly when subjected to the hot alkaline water of a dishwashing machine. Ordinary "Bakelite" varnish is preferably cured at temperatures so high as to be detrimental to the rubber of the rack and is not sufficiently flexible to prevent cracking when heavy pieces of chinaware are bumped against its surface.

By employing a combination of a suitable drying oil and "Bakelite" varnish a coating is produced on the rubber which is practically as flexible as the rubber and resists being flaked off, due to being bumped by dishes or otherwise contacted.

A preferred formula for a varnish to be used in accordance with my invention is as follows:

| | Pounds |
|---|---|
| Phenol formaldehyde resin | 100 |
| China-wood oil | 180 |
| Modified raw linseed oil | 20 |
| Manganese resinate | 0.78 |
| Lead resinate | 1.40 |
| Ethyl ether of ethylene glycol | 45 |
| Xylol | 15 |
| Petroleum naphtha | 240 |

In producing the varnish, the phenol formaldehyde resin or "Bakelite" is mixed with an equal amount of the China-wood or tung oil and held at 400° F. for one hour. The balance of the oil is then added and the temperature of the mixture is again raised to 400° F. in about 15 to 20 minutes and held at that temperature for substantially 30 minutes. The linseed oil and the "driers", namely, the manganese resinate and lead resinate, are then added and the mixture maintained at 400° F. for 30 minutes. After removing the mixture from the source of heat, about 10 gallons of the mineral spirits are added. The remaining portion of the mineral spirits and the xylol and ethyl ether of ethylene glycol or "Cellosolve" are then added and the resultant mixture filtered. The cooking or heating during the compounding of the varnish effects an initial oxidation of the varnish, and the metal resinates act as driers for the oil.

It will be seen that the proportions and constituents of the preferred formula may be varied from the figures specified, depending upon the particular qualities it is desired to impart to the varnish.

The varnish may be applied to the rubber coated rack in any suitable manner such as spraying or dipping. After application the varnish will ordinarily form a non-tacky film in about 2 hours and be fairly hard in about 3 hours of air drying.

When properly applied and dried, the varnish forms a tough coating which is resistant to the hot alkaline water of the dishwashing machine. The oil, grease, and butter which customarily contaminate dirty dishes will rapidly deteriorate the rubber of dish racks, but when coated in accordance with my invention, the rubber is protected against this action. Silverware is protected by the varnish from the action of sulfur contained in the rubber. When the varnish finally does begin to wear off of the rubber, this action is so slow as to release the harmful constituents of the rubber at a sufficiently slow rate to prevent substantial discoloration of the silver.

It is evident that my invention may be applied to other articles than dish racks. This and such other modifications which come within the spirit of my invention are intended to be included in the appended claims.

I claim:

1. A dish rack, comprising a series of contacting wires covered with a continuous layer of vulcanized rubber, said rubber being covered by a continuous coating of an elastic varnish containing a phenol condensation product.

2. A metallic dish rack covered with a continuous layer of vulcanized rubber, said rubber being covered by a varnish containing phenol formaldehyde resin and China-wood oil in the proportion of about 100 parts of the former to about 180 parts of the latter.

3. A dish rack covered with a continuous layer of vulcanized rubber, said rubber being covered by an elastic varnish containing a phenol formaldehyde resin, a drying oil and a drier.

4. A dish rack covered with a continuous layer of vulcanized rubber, said rubber being covered by a varnish containing approximately 100 parts of a phenol formaldehyde resin, 180 parts of China-wood oil, 20 parts of linseed oil, and small quantities of manganese and lead resinates.

5. A dish rack covered with a layer of vulcanized rubber, said rubber being covered with a varnish containing a phenol formaldehyde resin and a sufficient quantity of a drying oil to cause said varnish to cure without substantial heating and to render said varnish flexible when cured.

6. A dish rack covered with a continuous layer of vulcanized rubber, said rubber being coated with an elastic varnish which will break off of said rubber under normal dishwashing machine conditions at a rate which will cause a slow liberation of tarnish producing compounds in said rubber.

EDGAR S. STODDARD.